Patented Nov. 30, 1948

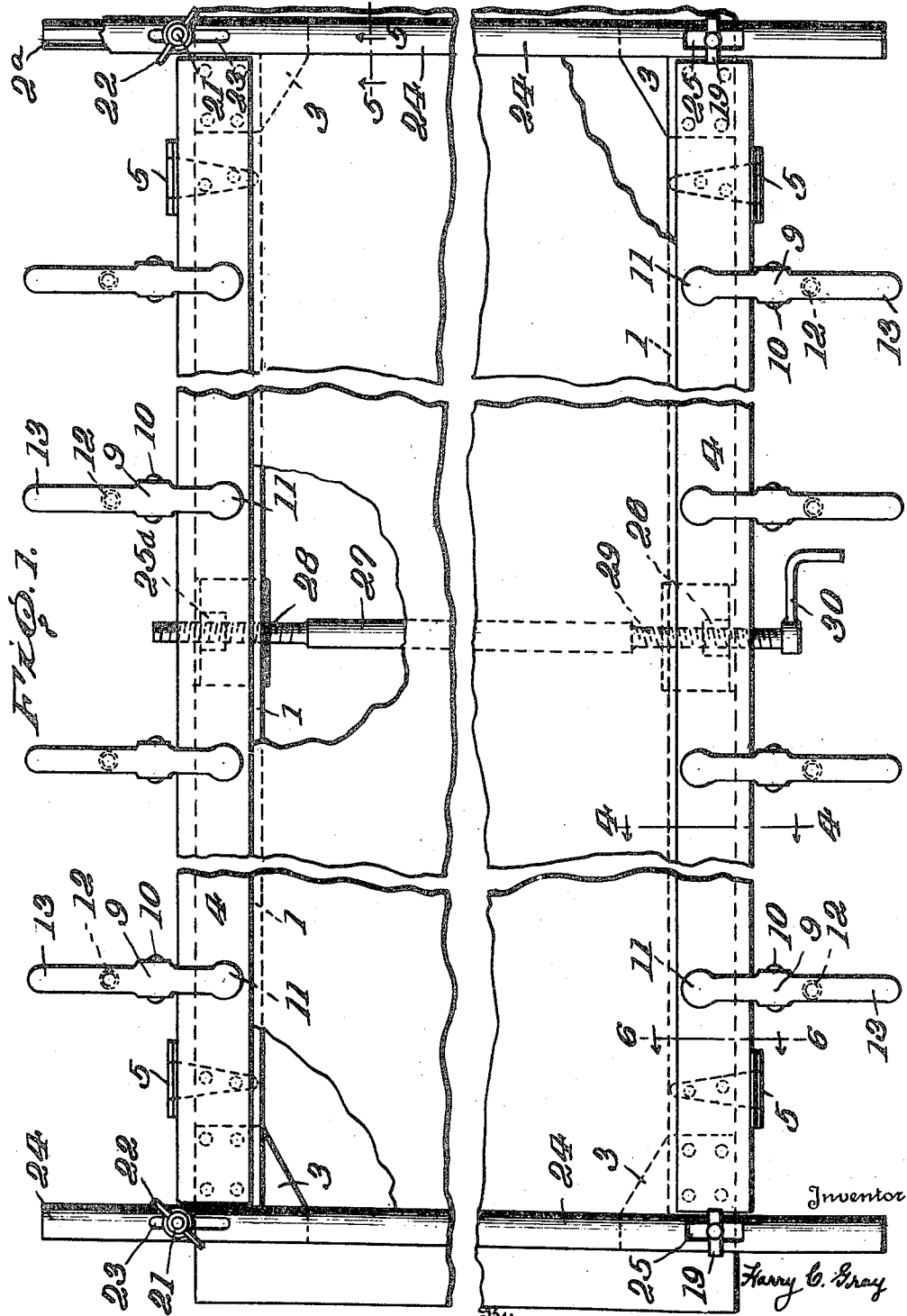

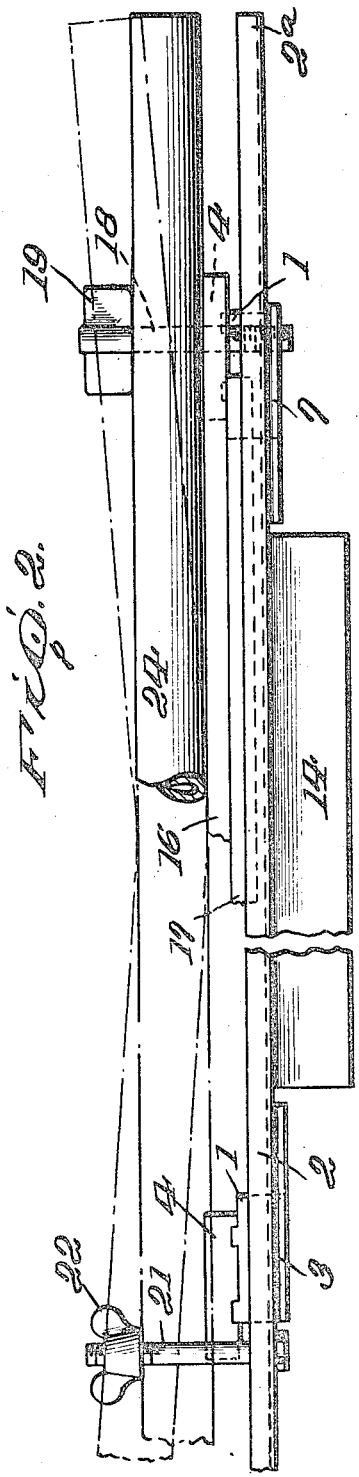
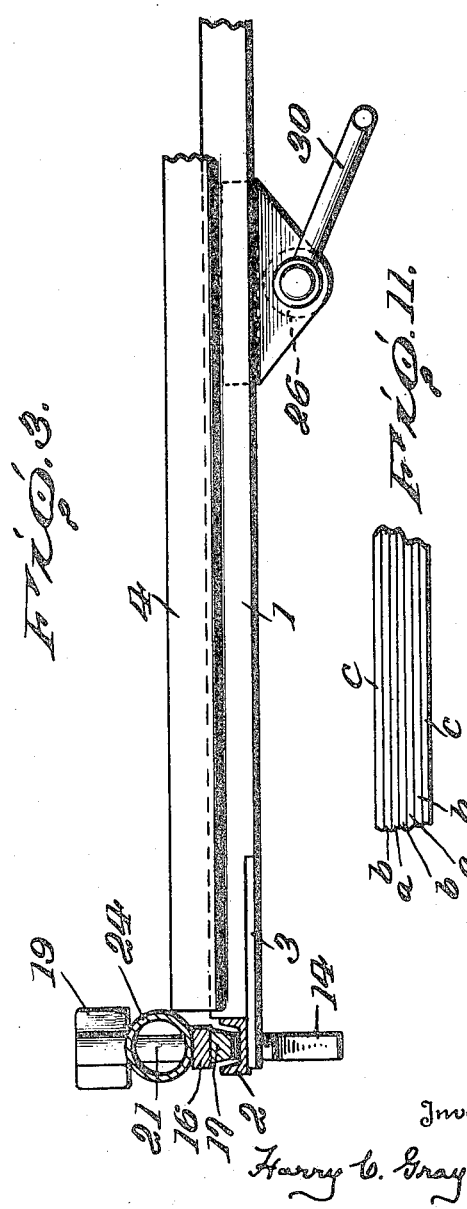

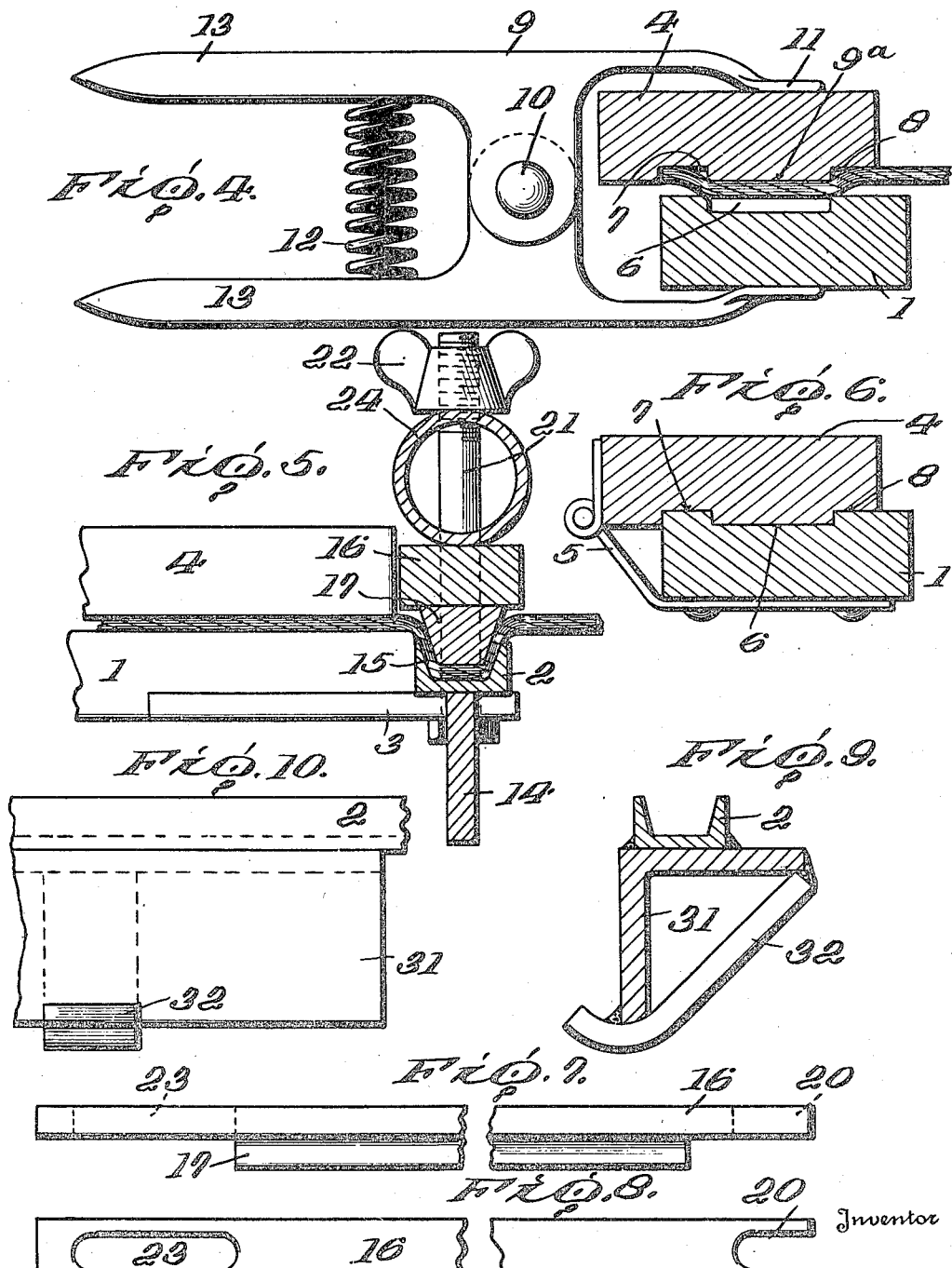

2,455,055

UNITED STATES PATENT OFFICE 2,455,055

CURING FRAME FOR RESIN IMPREGNATED STOCK SHEETS

Harry C. Gray, Chicago, Ill., assignor to Continental Can Company, Inc., New York, N. Y., a corporation of New York Application September 7, 1944, Serial No. 553,073

3 Claims. (Cl. 154—1)

The invention relates to new and useful improvements in a curing frame for resin impregnated stock sheets, and more particularly stock sheets which are made up of laminated impregnated fabric layers which are covered on both sides during curing with imperforate sheets such as Cellophane.

An object of the invention is to provide a curing frame which may be readily attached to the webs making up the stock sheets after they have been assembled and while said webs are under tension and prior to the cutting of the webs to form the stock sheets.

A further object of the invention is to provide a curing frame of the above type wherein the laminated layers including the covering sheets are firmly clamped along the side edges of the stock sheet and across the end edges to said curing frame.

A further object of the invention is to provide clamping devices for securing the stock sheet to the curing frame which are so constructed as to accomplish a firm grip on the assembled sheets and coverings so as to form a substantially enclosed casing for the stock sheets which will maintain the same out of contact with the air during curing.

A further object of the invention is to provide a curing frame of the above type with means for forcibly separating the central portions of the side members of the frame so as to maintain the stock sheets under lateral tension during curing.

These and other objects will in part be obvious and will in part hereinafter be more fully disclosed.

In the drawings:

Figure 1 is a plan view of a curing frame embodying the improvements;

Figure 2 is a view showing a portion of one of the end members of the curing frame and the clamping device associated therewith, the pressure bar being shown in dotted lines in its initial position and in full lines in position for forcing the clamping bar into firm engagement with the stock sheets on the curing frame;

Figure 3 is a view showing one of the side members of the curing frame in side elevation and an end member and the clamping devices associated therewith in section;

Figure 4 is a sectional view on an enlarged scale on the line 4—4 of Figure 1;

Figure 5 is a sectional view on an enlarged scale on the line 5—5 of Figure 1;

Figure 6 is a sectional view on an enlarged scale on the line 6—6 of Figure 1;

Figure 7 is a side view of one of the end clamping members;

Figure 8 is a plan view of the same;

Figure 9 is a view in transverse section showing a slightly modified form of an end member;

Figure 10 is a side view of a portion of the end member shown in Figure 9; and

Fig. 11 is a view showing diagrammatically an edge portion of a stock sheet.

The invention has to do with a curing frame for a stock sheet which is made up of a series of laminated layers shown more or less diagrammatically in Figure 11 of the drawings. Certain of these layers may be made of glass cloth and others of duck. In the illustrated embodiment of the stock sheet shown in Figure 11 the layers $a$—$a$ are of glass cloth, the layers $b$—$b$ are duck, and the outer covering layers $c$—$c$ are of Cellophane. The layers $a$—$a$ and $b$—$b$ are each impregnated with a low pressure curing resin of any of the well known types.

After the webs have been impregnated, they are assembled and pressed to the desired thickness of the stock sheets. The Cellophane sheets which completely cover the upper and lower faces of the assembled webs are applied during the assembling of the laminated layers. The method of forming the stock sheets is shown, described and claimed in United States Patent No. 2,432,752, granted December 16, 1947.

The present invention has to do with a curing frame which is attached to these webs after which the webs are cut into stock sheets, and while the stock sheets are held in stretched condition on the curing frame, they are subjected to heat treatment for setting the resin, thus completing the stock sheet. After this, of course, the curing frame is removed, as is also the covering Cellophane sheets.

The curing frame forming the subject matter of the present invention consists of side bars 1, 1 which are parallel and spaced from each other, and end bars 2, 2. The side bars abut against the end bars and are rigidly secured thereto by gusset plates 3. These gusset plates 3 are welded to the under face of the bars 2. The side bars are preferably of wood and the gusset plates are secured thereto by screws, as indicated in Figure 1. This makes up a rigid frame to which the stock sheets are attached. The stock sheets are clamped to these side bars by clamping devices which are similar in construction and a detailed description of one will answer for the other.

Said clamping devices include a bar 4 which extends from one end member to the other along the upper face of the side bars. These bars 4 are secured to the side bars 1 by hinges 5, as shown in the drawings, there are only two hinges, although any number might be used. The side bar 1 is provided with a channel 6 which extends along the upper face of the side bar and the clamping bars 4 are grooved at 7 and 8 so as to provide a projecting portion 9a adapted to substantially fit within the channel 6. The laminated sheets with the covering sheets therefor extend all the way across the side bar 1 to the outer edge thereof, as shown in Figure 4, and the clamping bar 4 is pressed against the edge portions of the stock sheets, forcing the same into the channel and thus firmly gripping the stock sheets and holding the covering sheets so tightly in contact with the laminated sheets as to form an enclosed casing therefor.

The clamping bars 4 are laid onto the stock sheets after which a series of clamping devices are attached to the side bars and clamping bars for clamping the edge portions of the stock sheet. One of these clamping devices is indicated at 9 in Figure 4 of the drawings. The clamping device consists of two levers pivoted at 10. Each lever has a clamping jaw 11. A spring 12 tends to force the clamping jaws toward each other. These levers are extended outwardly from their pivot 10 so as to provide handle members 13, 13. These handle members are grasped by an operator, the jaws separated and then placed so that one jaw engages the under face of the bar 1 and the other jaw engages the upper face of the clamping bar 4. When the operator releases the handles 13 the spring 12 will force the jaws toward each other and thus the clamping of the stock sheet to the side frame members is accomplished.

Attached to the central portion of the end bar 2 is a depending web 14. The end bar 2 is made of metal and this web 14 is welded thereto and serves as a strengthening web for the end bar. As shown in Figure 2, the web 14 terminates short of the ends of the end bar 2. The end bar 2 is channel-shaped. Associated with each end bar are clamping devices for clamping the end portions of the stock sheet to the end bars. These clamping devices are similar in construction and a description of one will answer for the other. Each end bar, as noted, has a channel 15 extending from one end thereof to the other. The clamping bar 16 shown in detail in Figures 7 and 8 is provided for clamping the end portions in the channel of the end bar 2. This clamping member 16 is provided on its under face with a truncated V-shaped clamping device 17 which contacts directly with the upper face of the edge portions of the stock sheet. The channel 15 has the walls thereof slightly inclined to conform to the inclination of the walls of the truncated clamping device 17. This clamping device 17 extends substantially from one side of the stock sheet to the other. The frame bar 1 is shown in dotted lines in Figure 2. It is noted that the end bar 2 projects beyond the frame bar so as to provide a handle member indicated at 2a. This is true at both ends of the bar 2.

At the right hand end of the end bar 2 is a clamping bolt 18 having a winged head 19 formed integral therewith. The clamping bar 16 is provided with an open end slot 20 which is placed on this bolt 18. At the other end of the end bar 2 is a clamping bolt 21 having a wing nut 22 threadedly attached thereto. The clamping member 16 has a slot through the left hand end thereof. The wing nut is removed and the bolt passed through this slot. The bolt 18 is secured to the end bar so that it may be turned.

After the clamping bar 16 has been thus placed on the laminated stock sheets, it is forced against the stock sheets by a presser bar 24. This presser bar 24 is provided with a rectangular slot 25 which is placed over the winged head 19 of the clamping bolt 18. The slot is wide enough to allow the winged head to pass therethrough when said head is turned so that it extends lengthwise of the end bar 2. After the presser bar has been placed over this clamping bolt, the bolt is turned to place the winged head transversely of the bar as shown in Figure 1. The presser bar 24 extends from the outer end of one handle member 2a to the outer end of the other handle member. It is also slotted longitudinally as shown at 23 in Figure 1. After the presser bar is placed on the clamping bar 16 and the winged head 19 turned so as to hold down the right-hand end of the bar, then the left-hand end of the bar, as viewed in Figure 2, is forced down onto the bolt 21 and the wing nut 22 attached to the bolt for holding the bar down. The presser bar is preferably bent upwardly from the center thereof toward its ends so that when the presser bar is forced down into a straight position there will be a uniform clamping force applied to the clamping bar from end to end thereof. This pressing of the bar down onto the bolt will force the clamping member 16 into very tight intimate contact with the stock sheets. The bar is put under sufficient tension so that it is practically moved to a straight position, as indicated in full lines in Figure 2, so that it engages the clamping member 16 from one end thereof to the other, and this will force the stock sheets down into the channel and thus provide a very tight gripping contact on the stock sheets and the covering sheets therefor so as to complete the encasing of the stock sheets within the Cellophane covering sheets.

The presser bar 24, as noted above, extends to the ends of the handle members 2a and the handle members may be used as a means not only for forcing the clamping bar into its clamping position, but also as handles for lifting and transporting the curing frame after it is attached to the stock sheets.

As noted above, the laminated sheets, together with the covering sheets, are assembled and placed under longitudinal tension and while so tensioned, the curing frame is attached to the webs which form the stock sheets. After the curing frame has been clamped at both ends to the webs and while under tension, the webs may be cut across close to the outside of the end frame and thus form the stock sheets. The frame is very rigid and will hold the stock sheets under the tension which was placed on the stock sheets when they were clamped to the curing frame. As noted above, the side members are made of wood and in order to prevent said side members from bending inwardly during the curing of the stock sheets, an expansion device is applied to the side members intermediate the ends thereof. As shown in Figure 1, the side member at the upper end of the view is provided with a nut 25a and the side member at the lower portion of the view is provided with a nut 26. A shaft 27 has a threaded portion 28 adapted to cooperate with the nut 25a and a threaded portion 29 adapted to cooperate with the nut 26. These threaded portions and nuts associated therewith are right and left hand threads so that when the shaft is turned in one direction, it will forcibly spread the center portions of the side frames. A crank handle 30 may be used for turning the shaft.

As shown in Figure 9 there is a slightly modified form of supporting web for the end member 2. The web is indicated at 31 and includes a vertical member and a horizontal member and the horizontal member of the web is welded to the under face of the bar 2. At spaced intervals there are legs or shoes 32 attached to the web member 31. The web member 14 serves as a support for the frame as it moves along the table when being attached to the assembled webs which produce the stock sheets. It also serves as a support when the frames are stacked one on another for inserting in the oven for curing the resin. These shoes 32 are for the purpose of supporting the frame as it slides along the table during the attachment of the frames to the webs and they also serve as a supporting means for spacing the frames from each other so as to permit the heat to circulate between the stacked frames.

After the webs have been assembled and while they are under tension the curing frame consisting of the side and end members is placed beneath the webs. These side and end members are rigidly connected as noted above and they form a rectangular frame which is, in width, substantially the width of the assembled webs and which is, in length, substantially the length of the desired stock sheet which is to be formed from said assembled webs. After the frame is placed under the assembled webs, the side clamping members are brought into engagement with the edge portions and they are firmly clamped to the side bars. Then the end clamping members and the presser rods are placed on the assembled webs and the webs firmly clamped to the end bars. After the assembled webs have been clamped to the frame, the shaft 27 is turned by the handle member in order to place the side frames under slight lateral strain so as to hold them in their spaced parallel relation and thus maintain the stock sheets under lateral tension during the curing operation. After the frame has been attached in the manner described, the web is cut across adjacent the end bar and thus the stock sheets are formed and are firmly held in tensioned condition ready for the curing operation. The frames may be stacked one on another and placed on a truck and moved into an oven where the resin is subjected to heat treatment for the setting of the same. After the resin has been properly cured, the frames are removed from the over and released from the stock sheets. The Cellophane covering sheets are firmly clamped along both sides and ends of the stock seets and serve as a casing for preventing air from contacting with the impregnated sheets during the curing thereof. These Cellophane covering sheets are removed from the stock sheets after the frame has been detached therefrom.

It is obvious that many changes in the details of construction of the curing frame and the clamping devices may be made without departing from the spirit of the invention as set forth in the appended claims.

I claim:

1. A curing frame for resin impregnated laminated stock sheets comprising spaced side bars and spaced end bars rigidly connected to form a frame for supporting the stock sheets, means associated with each side bar for clamping the side edge portions of the stock sheets thereto, a clamping bar associated with each end for engaging the stock sheets and clamping the same against the bar, a presser bar associated with the clamping bar, said presser bar being bent downwardly intermediate its ends and clamping bolts disposed at the ends of said presser bar for holding said presser bar when pressed against said clamping bar to a straight position whereby a uniform clamping force is applied to the clamping bar from end to end thereof.

2. A curing frame for resin impregnated laminated stock sheets comprising spaced side bars and spaced end bars rigidly connected to form a frame for supporting the stock sheets during curing, means associated with each side bar for clamping the side edge portions of the stock sheets thereto, clamping bolts mounted in said end bars in substantial alignment with the side bars, a clamping bar extending from one clamping bolt to the other, said clamping bar being free from connection with the end bars between said clamping bolts, and means associated with the clamping bolts and engaging the clamping bars intermediate their ends for forcing said clamping bars into engagement with the stock sheet.

3. A curing frame for resin impregnated laminated stock sheets comprising spaced side bars and spaced end bars rigidly connected to form a frame for supporting the stock sheets during curing, means associated with each side bar for clamping the side edge portions of the stock sheets thereto, clamping bolts mounted in said end bars in substantial alignment with the side bars, a clamping bar extending from one clamping bolt to the other, said clamping bar being free from connection with the end bars between said clamping bolts, a presser bar associated with each clamping bar, said presser bar being bent downwardly intermediate its ends, said clamping bolts engaging said presser bar at the ends thereof for holding said presser bar when pressed against the clamping bar to a straight position whereby a uniform clamping force is applied to the clamping bar from end to end thereof.

HARRY C. GRAY.

REFERENCES CITED

The following references are of record in the file of this patent:

UNITED STATES PATENTS

| Number | Name | Date |
|---|---|---|
| 362,429 | Crowell | May 3, 1887 |
| 1,557,346 | Schwanhausser | Oct. 13, 1925 |
| 1,613,933 | Castleton | Jan. 11, 1927 |
| 2,342,025 | Watter | Feb. 15, 1944 |
| 2,345,232 | Boushelle | Mar. 28, 1944 |
| 2,347,711 | Redmond | May 2, 1944 |
| 2,388,541 | Henderson | Nov. 6, 1945 |